United States Patent [19]

Summers et al.

[11] 4,153,579
[45] May 8, 1979

[54] PLATINUM, RHODIUM, AND PALLADIUM CATALYST FOR AUTOMOTIVE EMISSION CONTROL

[75] Inventors: Jack C. Summers, Rochester; Louis Hegedus, Grosse Pointe Woods, both of Mich.

[73] Assignee: General Motors Corporation, Detroit, Mich.

[21] Appl. No.: 875,616

[22] Filed: Feb. 6, 1978

Related U.S. Application Data

[63] Continuation-in-part of Ser. No. 871,706, Jan. 23, 1978, Pat. No. 4,128,506.

[51] Int. Cl.² .................. B01J 21/04; B01J 23/10; B01J 23/42; B01J 23/44
[52] U.S. Cl. .................. 252/462; 252/466 PT; 423/215.5
[58] Field of Search ............. 252/462, 466 PT; 423/213.5

[56] References Cited

U.S. PATENT DOCUMENTS

| 3,257,163 | 6/1966 | Stiles | 423/213.5 |
| 3,741,725 | 6/1973 | Graham | 252/466 PT |
| 4,051,072 | 9/1977 | Bedford et al. | 252/466 PT |
| 4,051,073 | 9/1977 | Hegedus et al. | 252/466 PT |

Primary Examiner—W. J. Shine
Attorney, Agent, or Firm—Sidney Carter

[57] ABSTRACT

A three-way layered catalyst for use in a stoichiometric air/fuel ratio system comprising an alumina support having deposited thereon the catalyst materials platinum, palladium and rhodium and having a first layer of platinum positioned at the support surface, a second layer of catalyst material selected from the group consisting of rhodium and a mixture of palladium and rhodium adjacent to and radially inward of the first layer with palladium inward of and adjacent to said second layer where the catalyst material of such layer is rhodium. Cerium oxide may be added to the support for improved performance.

6 Claims, 13 Drawing Figures

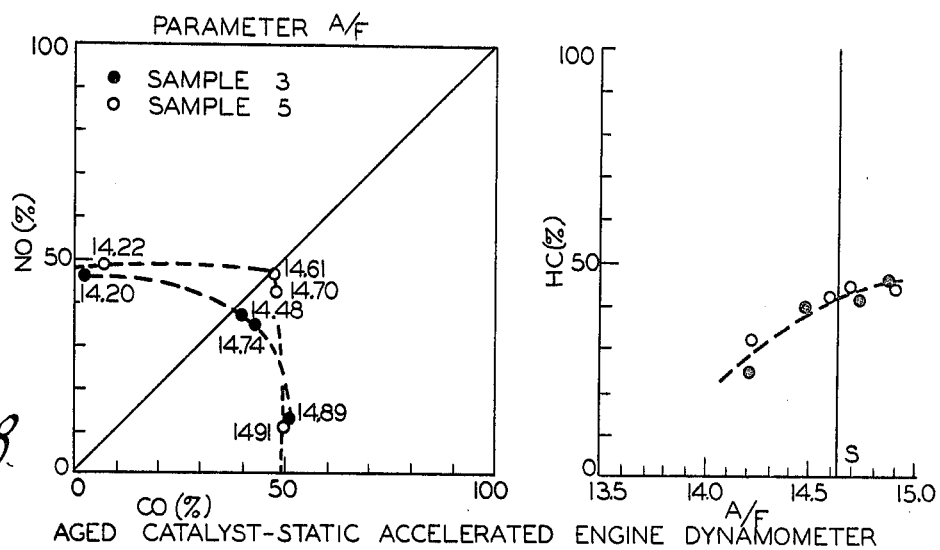
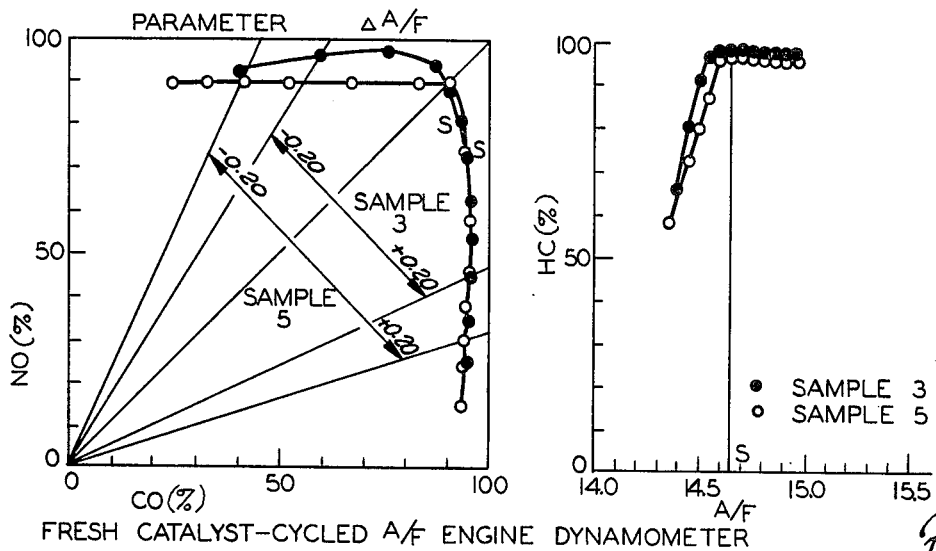
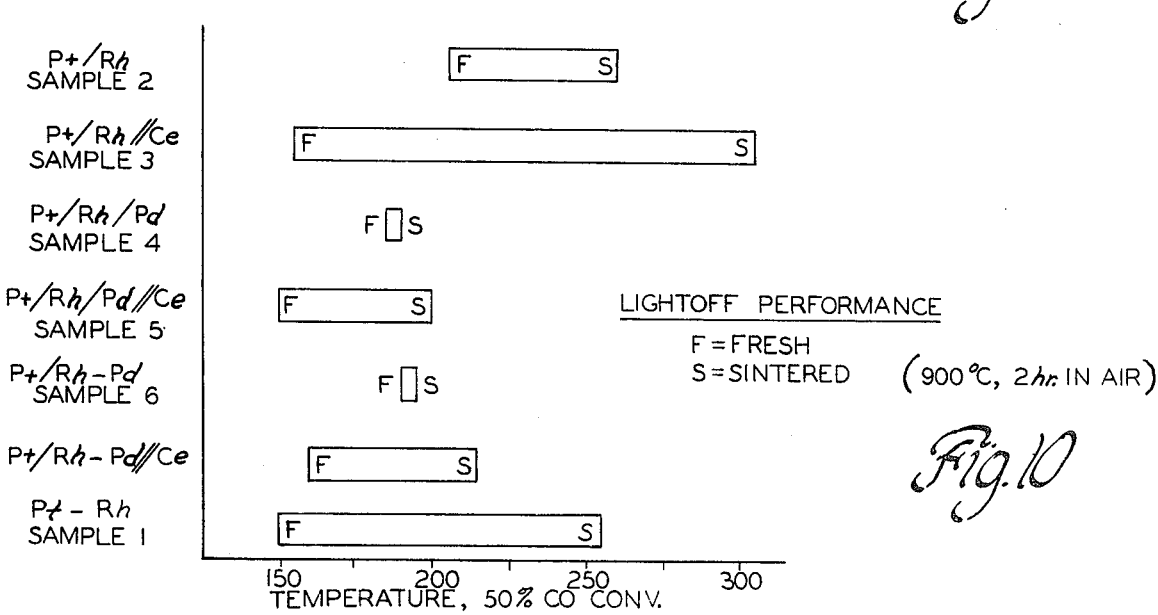
Fig. 8 — Aged Catalyst-Static Accelerated Engine Dynamometer
Fig. 9 — Fresh Catalyst-Cycled A/F Engine Dynamometer
Fig. 10 — Lightoff Performance, F = Fresh, S = Sintered (900°C, 2 hr. IN AIR)

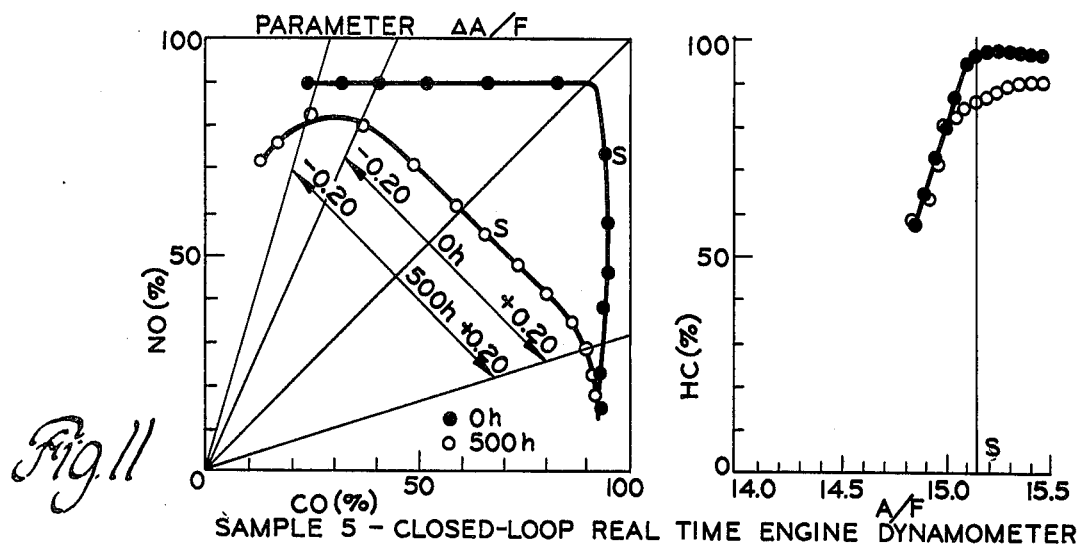
Fig. 11 SAMPLE 5 — CLOSED-LOOP REAL TIME ENGINE DYNAMOMETER
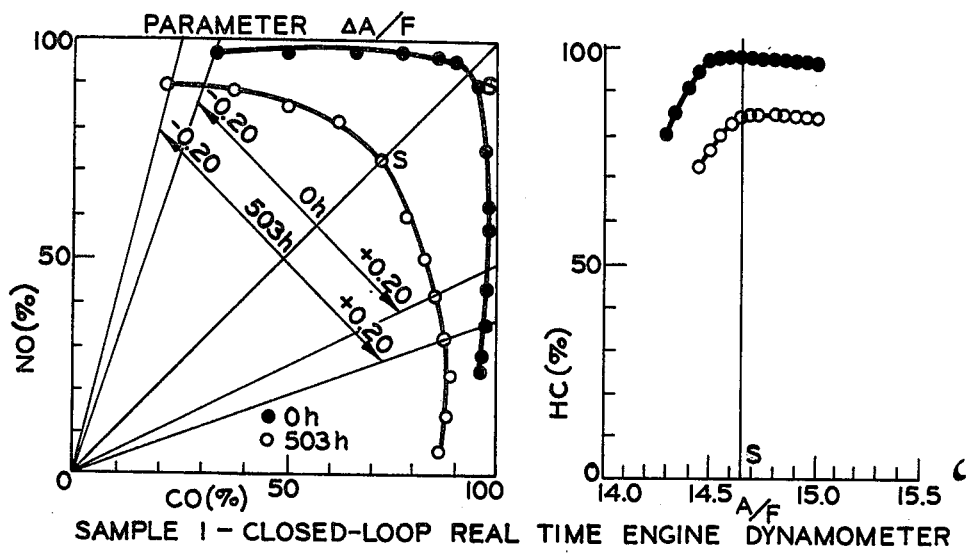
Fig. 12 SAMPLE 1 — CLOSED-LOOP REAL TIME ENGINE DYNAMOMETER
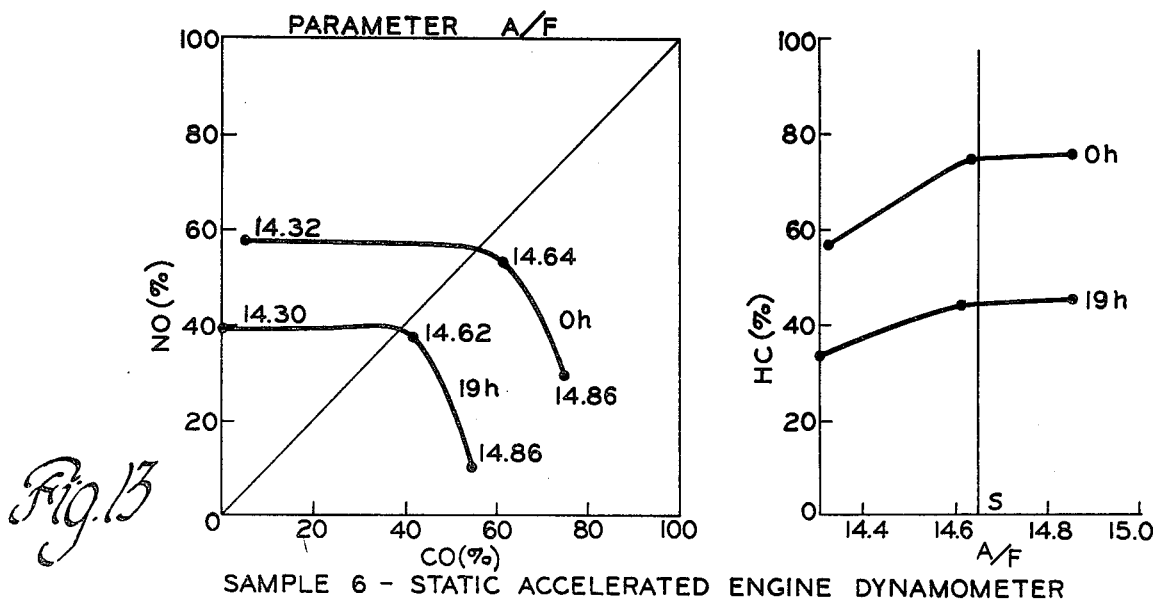
Fig. 13 SAMPLE 6 — STATIC ACCELERATED ENGINE DYNAMOMETER

PLATINUM, RHODIUM, AND PALLADIUM CATALYST FOR AUTOMOTIVE EMISSION CONTROL

This invention is a continuation-in-part of applicants' copending application Ser. No. 871,706, filed Jan. 23, 1978, now U.S. Pat. No. 4,128,506.

Devices of both the particulate and monolith type are today in use on motor vehicles for the purpose of cleaning up the exhaust emissions to levels required by Federal and State standards and our invention applies to either form. However, as standards require lower levels of unburned hydrocarbons, carbon monoxide, and $NO_x$, a greater demand is placed on the known catalysts for higher conversion efficiencies while still remaining effective over a lifespan as long as 50,000 miles and beyond with minimal deterioration due to poisoning or sintering. This invention relates to improved three-way catalysts having improved catalytic performance over their required lifetime in the operating environment of automotive emissions which includes precursor compounds of lead and phosphorus, known catalyst poisons. More particularly, this invention pertains to a platinum and rhodium type catalyst additionally containing palladium for simultaneously oxidizing unburned hydrocarbons and carbon monoxide and reducing the nitrogen oxides in vehicle exhaust gas, the catalyst being operative in a system in which the air-to-fuel ratio to the engine is controlled at the stoichiometric point with variations in the mixture narrowly limited on both the rich and lean side of the stoichiometric point.

Applicants have conducted extensive theoretical and laboratory studies, with results verified by engine dynamometer testing, and have developed an improved catalyst having the desired characteristics of improved conversion efficiencies as the result of a greater resistance to poisoning. Applicants' improved catalyst is designed as a layered catalyst. As used herein, any reference to layered catalyst is intended to mean an alumina support or coating, hereinafter referred to as support, having two or more adjacent layers or bands in which the first or exterior layer contains platinum having good resistance to poisoning by constituents in automotive exhaust gas, the maximum concentration (the term concentration meaning the amount of a catalyst material at any depth of penetration) of platinum being at or close to the surface of the alumina support with the concentration decreasing with increasing penetration into the support, the second layer having a catalyst material selected from the group consisting of rhodium and a mixture of palladium and rhodium having greater susceptibility to poisoning than platinum with the minimum concentration of the catalyst material of the second layer in the first layer being at or close to the surface of the alumina support with the concentration thereof increasing to a maximum with increasing penetration into the support, the boundary between the first and second layers being the depth at which the maximum concentration of rhodium exists where rhodium is the catalyst material in the second layer, the boundary between the layers where both palladium and rhodium are impregnated on the support as the second layer being the first to occur boundary either as defined for rhodium or as defined by the depth of equal concentration of platinum and palladium, the concentration of the catalyst material of the second layer decreasing progressively with increasing penetration from its depth of maximum concentration with the greater portion of the catalyst materials other than platinum being below the first layer, the catalyst containing both palladium and rhodium within the body of the support below the first layer. The term layer or band is as described above, or, briefly, as regards the first layer, the depth or width of alumina impregnated with and containing the maximum concentration of platinum and extending from the surface to the depth at which the boundary with the second layer exists, the second layer extending inwardly therefrom and containing the greater portion of the rhodium or rhodium and palladium mixture.

Among the catalysts in the prior art are catalysts which include special physical structures. The patent to Michalko U.S. Pat. No. 3,259,589 dated July 5, 1966 discloses a catalyst for treatment of combustible waste gas wherein an organic acid such as citric acid is used in controlled amounts with the solution of catalytically active material in order to produce a finite zone of the catalytic material either on the surface of the alumina support, or a distance below the surface, or throughout the body of the support. The patent to Hoekstra U.S. Pat. No. 3,367,888 dated Feb. 6, 1968 discloses a catalyst having an alumina support on which a zone of platinum is deposited on the outer surface of the support "without any substantial penetration thereof", this being achieved by the use of a sulfurized carboxylic acid. The patent to Hoekstra U.S. Pat. No. 3,360,330 dated Dec. 26, 1967 uses an organic acid such as disclosed by Michalko U.S. Pat. No. 3,259,589 to position platinum a finite distance below the surface of the support followed by impregnation with barium hydroxide and chromic acid to form a barium chromate or dichromate as a coating on the catalyst surface. U.S. Pat. No. 4,006,103 to Meguerian et al dated Feb. 1, 1977 discloses a monolith catalyst for use in a two stage catalyst system wherein nickel and rhodium are deposited on the support sequentially with nickel deposited first, rhodium being used to promote "strongly the activity of nickel", both metals having similar distribution with the depth of impregnation. U.S. Pat. No. 3,965,040 to Kobylinski et al dated June 22, 1976 discloses a catalyst for use in a two stage catalyst system wherein platinum or palladium and rhodium or ruthenium are deposited on the support sequentially with platinum or palladium deposited first, both metals having either similar distribution with the depth of impregnation or the ruthenium or rhodium being concentrated on the surface, especially where the impregnation solution also contains a "refractory material, such as a salt of aluminum, titanium, silica, magnesium or zirconium". U.S. Pat. No. 3,898,181 to Barker dated Aug. 5, 1975 discloses a catalyst having two layers in which nickel is first deposited on an inert support followed by a coating of a high surface area support material such as alumina, rhodium being deposited on the high surface area support material, it being desired that the rhodium have its greater concentration "on the exposed surface of the alumina".

The prior art also teaches the use of cerium on catalyst support material to achieve thermal stability and improved dispersion of the catalytic materials impregnated on the support, as disclosed in the patent to Sergeys et al U.S. Pat. No. 3,903,020 dated Sept. 2, 1975.

The patent to Adawi et al U.S. Pat. No. 4,024,706 dated May 24, 1977 discloses that improved conversion of exhaust emissions is achieved by low frequency, i.e., 1-5 cycles per second, displacement of the A/F ratio by equal amounts on either side of the stoichiometric ratio.

As distinguished from the prior art, applicants have developed a layered platinum, rhodium, palladium catalyst having significantly improved performance in a poison (Pb, P) containing automotive exhaust over those of catalysts currently used in automotive emissions control. In the improved catalyst the alumina support is provided with a first layer of platinum positioned on the surface of the support and penetrating the body thereof inwardly from the surface with a second layer or rhodium or a mixture of rhodium and palladium adjacent to the inner boundary of the first layer and penetrating the body of the support inwardly from such boundary with the greater amount of rhodium and palladium positioned inwardly from the first layer in order to protect the rhodium and palladium from rapid deterioration and fall-off in conversion performance due to poisoning. Further, while larger amounts of rhodium may be used, our invention enables the use of rhodium in amounts as low as about 0.002% or more by weight of the catalyst since the greater portion is protected from poisoning by the exterior platinum layer. This is very significant not only because of decreased cost but since widespread use of greater quantities of rhodium, e.g., 0.019% by weight, in vehicle converters would tend to disrupt the supply and economic balance of the noble metals platinum, palladium and rhodium which are mined in South Africa where the naturally occurring ratio of platinum to rhodium is about 18:1 by weight. Further, while small amounts of rhodium and palladium are present in the first or exterior layer of platinum, the presence of such small amounts of rhodium near the surface may be important to suppress the undesirable formation of ammonia in the fresh or relatively fresh catalyst.

It is therefore an object of our invention to provide a layered three-way catalyst for automotive exhaust gas clean-up having platinum as the outermost layer to provide improved conversion efficiency and greater resistance to poisoning for the additionally contained rhodium and palladium. It is a further object of our invention to provide an improved catalyst having a first layer of platinum penetrating the support body from the surface thereof and having a second layer of rhodium or a mixture of rhodium and palladium adjacent to the first layer and penetrating the support body from the inner boundary of the first layer, the rhodium being present on the catalyst in an amount as low as about 0.002% by weight of the catalyst, the greater portion of the rhodium and palladium being in the support below the first layer. It is a still further object of our invention to provide a catalyst as described further containing cerium.

The foregoing and other objects of our invention will be apparent from the following description and attached drawings in which FIG. 1 shows the relative rhodium distribution on the catalyst support for Sample 4.

FIGS. 2 and 3 show, respectively, the fresh and aged engine dynamometer performance for Sample 1 at static and cycled A/F conditions;

FIGS. 4, 5, and 6 show, respectively, the fresh-static, aged-static, and fresh-cycled performance covering the addition of palladium to platinum/rhodium catalysts in the absence of cerium, Samples 2 and 4;

FIGS. 7, 8, and 9 show, respectively, the fresh-static, aged-static, and fresh-cycled performance covering the addition of palladium to platinum/rhodium catalysts in the presence of cerium, Samples 3 and 5;

FIG. 10 shows the light-off effects of adding palladium and/or cerium to fresh and sintered platinum, rhodium catalysts;

FIG. 11 shows the cycled dynamometer performance of Sample 5 (low rhodium) in a real-time, closed-loop dynamometer aging test;

FIG. 12 shows the cycled dynamometer performance of Sample 1 (high rhodium) in a real-time, closed-loop dynamometer aging test; and FIG. 13 shows the fresh-static and aged-static performance covering palladium and rhodium as the codeposited second layer.

Figure 1:
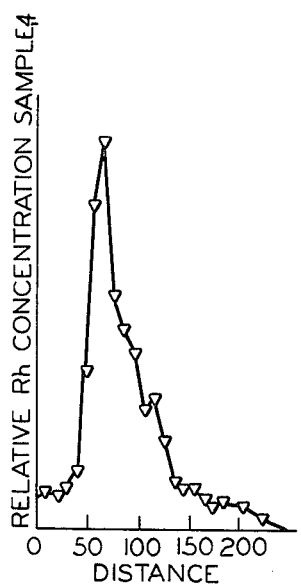

As described in detail in our copending applications Ser. No. 871,706 and Ser. No. 815,982 filed July 15, 1977, now abandoned, the performance and durability properties of noble metal catalysts are strongly influenced by the locations of the catalyst materials. As described herein in detail, in carrying out our tests we prepared seven platinum and rhodium containing catalyst samples of different configurations, four additionally contained palladium and three had cerium impregnated through the body of the support. The samples were prepared having three different configurations as regards positioning of the catalyst material on the support. The conversion performance tests using the three-way layered catalyst containing palladium in addition to platinum and rhodium and configured in accordance with our invention as described herein showed significantly improved CO light-off performance and somewhat improved CO and/or HC conversion as compared with results obtained with both commercial catalysts and catalysts not containing palladium. It should be noted that improved light-off is very important to vehicle certification since the 1975 Federal Test Procedure (FTP) is heavily weighted on the light-off portion of the test cycle during which the highest percentage of CO is found in the exhaust gas.

The catalysts prepared and tested in accordance with our invention had the following configurations:

(1) Pt layer exterior with Rh layer interior, (Pt/Rh),
(2) Pt layer exterior with Rh and Pd layers interior, (Pt/Rh/Pd),
(3) Pt layer exterior with Rh and palladium deposited as a mixture below the Pt layer, (Pt/Rh-Pd).

Each of these configurations was formed both with and without cerium dispersed through the body of the support. These catalysts, except for the cerium containing sample of configuration (3), with their related properties and a high rhodium commercial catalyst are shown in Table I below.

Table I

| | Properties and Methods of Preparation of Catalysts | | | | | |
|---|---|---|---|---|---|---|
| Configuration | Commercial Pt-Rh | Pt/Rh | Pt/Rh//Ce | Pt/Rh/Pd | Pt/Rh/Pd//Ce | Pt/Rh-Pd |
| Sample | 1 | 2 | 3 | 4 | 5 | 6 |
| Support | Rhone-Progil | GM | GM | GM | GM | GM |
| Washing Agent | — | HCl | HCl | HCl | HCl | HCl |

Table I-continued

Properties and Methods of Preparation of Catalysts

| Configuration | Commercial Pt-Rh | Pt/Rh | Pt/Rh//Ce | Pt/Rh/Pd | Pt/Rh/Pd//Ce | Pt/Rh-Pd |
|---|---|---|---|---|---|---|
| Sample | 1 | 2 | 3 | 4 | 5 | 6 |
| Support | Rhone-Progil | GM | GM | GM | GM | GM |
| Residual Na (w %) | ~0.09 | 0.006 | 0.006 | 0.006 | 0.006 | 0.006 |
| Pt toz/car* | 0.042 | 0.031 | 0.033 | 0.034 | 0.039 | 0.038 |
| w % | 0.045 | 0.043 | 0.045 | 0.048 | 0.055 | 0.053 |
| begins ($\mu$m) | 0 | 0 | 0 | 0 | 0 | 0 |
| ends ($\mu$m) | 190±70 | 67±24 | 57±15 | 51±8 | 50±19 | 60(est.) |
| complex | *** | $H_2PtCl_6$ | $H_2PtCl_6$ | $H_2PtCl_6$ | $H_2PtCl_6$ | $H_2PtCl_6$ |
| imprg. method | spray(?) | spraying | spraying | spraying | spraying | spraying |
| Rh toz/car* | 0.018 | 0.0019 | 0.0018 | 0.0019 | 0.0022 | 0.0015 |
| w % | 0.019 | 0.0026 | 0.0025 | 0.0026 | 0.0031 | 0.0021 |
| max ($\mu$m) | 0 (?) | 60 (est.) | 60 (est.) | 58 | 60 | 60 (est.) |
| ends ($\mu$m) | *** | — | — | 132 | 160 | 150 (est.) |
| complex | *** | $(NH_4)_3RhCl_6$ | $(NH_4)_3RhCl_6$ | $(NH_4)_3RhCl_6$ | $(NH_4)_3RhCl_6$ | $(NH_4)_3RhCl_6$ |
| imprg. method | spray (?) | inclp. wet. | incip. wet | incip. wet. | incip. wet | incip. wet. |
| blocking agent | none (?) | citric acid | citric acid | citric acid | citric acid | citric acid |
| Pd toz/car* | 0 | 0 | 0 | 0.011 | 0.014 | 0.012 |
| w % | | | | 0.015 | 0.020 | 0.017 |
| begins ($\mu$m) | | | | 121±14 | 81±18 | 58±12 |
| ends ($\mu$m) | | | | 352±60 | 169±30 | 288±44 |
| complex | | | | $PdCl_2+HCl$ | $PdCl_2+HCl$ | $PdCl_2+HCl$ |
| imprg. method | | | | incip. wet. | incip. wet. | incip. wet. |
| blocking agent | | | | citric acid | citric acid | |
| Ce** (w % from nitrate) | 0 | 0 | 1.0 | 0 | 1.0 | 0 |
| Calcination Atm. | ? | air | air | air | air | air |
| Deployment Sequence | ? | Rh,Pt | Ce,Rh,Pt | Pd,Rh,Pt | Ce,Pd,Rh,Pt | Pd-Rh,Pt |

*Type 260 (4261 cm³) converter.
**Uniformly impregnated along the pellet radius.
***Based on their reactivity and poisoning behavior, both Rh and Pt are believed to be positioned near the outer surface of the pellets.
The term "ends" as pertains to Pt and Pd refers to the visually sharp color break in the metal color band when viewed under microscope after $SnCl_2$ staining, Pt being light brown or black and Pd dark gray.

Table II shows the physical properties of the pellet supports used in the samples shown in Table I. The supports used in Samples 2–6 were prepared in accordance with the teachings of U.S. Pat. No. 4,051,072 dated Sept. 27, 1977 to Bedford et al. Additionally, the alumina supports were washed with 0.04 wt. % HCl followed by water rinsing to remove residual Na and HCl. This treatment controls the Na content to eliminate Na as a possible variable. The alumina support used to prepare the catalysts was in the form of 0.32 cm diameter spheres.

It should be understood that the support may be in the form of pellets or granules shaped other than spherical, e.g., cylindrical, such as extrudates, granular, rings, and the like, and also including monolith forms of support. That is, the support may be an all alumina body or a ceramic monolithic body or pellet with an alumina coating. The form and shape of the basic support is not relevant to our invention which, as described, is directed to the catalyst configuration from the standpoint of location of layers of different catalyst materials on the support, the alumina body or coating.

Table II

Properties of Catalyst Supports Employed

| | Sample 1 | All Other Samples |
|---|---|---|
| Total pore volume (cm³/g) | 0.595 | 0.887 |
| Macro pore volume (cm³/g) | 0.115 | 0.230 |
| Micro pore volume (cm³/g) | 0.480 | 0.657 |
| Macro pore radius (A°)* | 4237 | 18553 |
| Micro pore radius (A°)* | 67 | 162 |
| BET surface area (m²/g) | 96 | 129 |
| Pellet density (g/cm³) | 1.135 | 0.853 |
| Effective diffusivity (cm²/sec) | 0.0110 | 0.0179 |
| Nominal pellet radius (cm) | 0.159 | 0.159 |

*integral averaged. Diffusivity is that of an $N_2$ pulse in the He-filled pores of the particular catalyst support, at 40° C. and 1 atm.

As can be seen from Table I, the platinum, rhodium and palladium loadings in weight percent, based on total catalyst weight, in each of the catalysts made up, Samples 2–6, were selected to remain closely similar in order to achieve results which are fairly comparable to each other. Commercial Sample 1 is a high rhodium catalyst and has an amount of rhodium which is about 9 times that of the other Samples. As used herein, references to metal, catalytically active materials and the like are intended to comprehend the materials both in the elemental state as well as in the oxide form when used in the context of the prepared catalyst since the materials after calcination exist probably in both states to at least some extent. It is to be noted that the characteristics of the support are not relevant to the invention disclosed herein since layering will function with any of the active aluminas known as catalyst support material. While we prefer to use the optimized types of support disclosed in applicants' U.S. Pat. No. 4,051,073 dated Sept. 27, 1977, and continuation-in-part application Ser. No. 815,791 filed July 15, 1977, now U.S. Pat. No. 4,119,571, our invention is not limited to the use of such optimized supports but is instead usable with supports having a surface area and pore volume, by way of example, less than that specified in our patent.

In making the catalyst Samples 2–6, those having a first or exterior layer of platinum with an interior impregnation of rhodium and palladium, impregnation of the support with platinum was achieved by spraying the impregnating solution whereas the rhodium and palladium was applied using the incipient wetness technique, it being understood that other well known methods for impregnation of the support may be used, e.g., soaking and tumbling. The method for achieving a layered catalyst by use of sequential impregnation with the different catalyst material solutions, one of which also contains an amount of active site blocking agents, e.g., acids such as hydrogen fluoride, citric acid, and the like, sufficient to block the active sites on the support to the desired depth, is as fully described hereinafter and in our co-pending application U.S. Ser. No. 815,982, such disclosure being incorporated herein by reference.

More particularly, in making the catalyst identified as Sample 2 having an exterior Pt layer and an interior Rh layer, an aqueous solution having a volume of 2700 cc and containing 27.37 cm$^3$ of $(NH_4)_3RhCl_6.3H_2O$ stock solution at 0.0032 g Rh/cm$^3$, 3.00 g citric acid monohydrate, 12.0 cm$^3$ of 3 M HCl, and having a pH=2.10 was impregnated on 3129 g of $Al_2O_3$. The impregnated support was then air dried and calcined in ambient air for 4 hours at 550° C.

As discussed in detail in copending application U.S. Ser. No. 815,982, the depth of blocking of active sites and therefore the penetration of the catalytic materials to form the layers, increases with an increase in the quantity of blocking acid used. In this instance, Sample 2, the quantity of citric acid was such as to produce layering whereby the maximum concentration of rhodium occurred at a depth of about 60$\mu$, estimated on the basis of catalyst design and measurement of Samples 4 and 5. Also, as described hereinafter and in our copending application U.S. Ser. No. 815,982, the pH of the impregnating solution affects the length of penetration of catalyst materials and site blocking, the lower the pH the deeper the penetration, a range of from about 2–3 being preferred, a pH as high as 5 being usable. In determining the location of the rhodium on the pellet, we used iron microprobe mass analysis, IMMA, this technique being highly sensitive to small quantities of rhodium.

Since the calcining of the impregnated support drives off the citric acid to unblock the sites and to decompose the rhodium salt to elemental and oxide form, the support is now prepared for the impregnation to form the outer layer of platinum. In Sample 2 an aqueous Pt solution was prepared containing 54.7 cm$^3$ of $H_2PtCl_6.9H_2O$ at 0.039 g Pt/cm$^3$ in a total volume of 300 cm$^3$ and having a pH=1.21. 238.6 cm$^3$ of this solution was sprayed on 3077 g of the Rh containing catalyst. The impregnated support was air dried and calcined in ambient air for a period of 4 hours at 550° C. The distribution of rhodium on the support in Sample 2 would be similar to that shown in FIG. 2 of our copending application Ser. No. 871,706 in which the maximum concentration of rhodium is at about 65$\mu$ below the surface.

In forming Sample 3, about 1% by weight cerium was first impregnated on the support using an aqueous solution of 2650 cm$^3$ containing 96.96 g $Ce(NO_3)_3.6H_2O$, this being impregnated on 3129 g of $Al_2O_3$. This catalyst was air dried, then calcined in air for 4 hours at 500° C. Rhodium wsa next impregnated on the cerium containing support in the manner and using the solution described for Sample 2. The outer platinum layer was then applied using an aqueous Pt solution containing 52 cm$^3$ of $H_2PtCl_6.9H_2O$ at 0.041 g Pt/cm$^3$ in a total volume of 300 cm$^3$ and pH=1.25. 242.1 cm$^3$ of this Pt solution was sprayed on 3096.5 g of Rh/Ce—$Al_2O_3$ catalyst. This was then air dried and calcined in air for 4 hours at 500° C. The distribution of rhodium on the support is estimated, as described above, to place the maximum concentration at about 60$\mu$ from the surface.

Sample 4 is a catalyst in accordance with our invention which contains platinum as the outer layer with palladium and rhodium impregnated therebelow as separate layers. For its preparation palladium was first impregnated on the support using an aqueous solution containing 19.6 cm$^3$ of $PdCl_2$ solution at 0.0313 g Pd/cm$^3$ and 5.794 g citric acid monohydrate in a total volume of 2700 cm$^3$ and having a pH=2.31, this being impregnated onto 3129 g of $Al_2O_3$. The impregnated catalyst was air dried and calcined in ambient air for 4 hours at 500° C. The palladium was visualized using the $SnCl_2$ treatment and was distributed as shown in Table I. Next, rhodium was impregnated using the manner of treatment and solution as described for Sample 2, the resultant catalyst being air dried and calcined as in all other Samples. Finally, the outer platinum layer was applied using an aqueous Pt solution having 55.7 cm$^3$ of $H_2PtCl_6.9H_2O$ at 0.040 g Pt/cm$^3$ in a total volume of 300 cm$^3$ of de-ionized water and pH=1.24, 242.4 cm$^3$ of this Pt solution being sprayed on 3128.5 g of the Rh/Pd/$Al_2O_3$ catalyst. This includes a 14% excess allotted for overspray loss. The catalyst was air dried and then calcined for 4 hours at 500° C. in air. The distribution of rhodium on the support is shown in FIG. 1, the maximum rhodium concentration being at 58$\mu$ below the surface of the pellet as determined by IMMA examination.

Sample 5 is a layered catalyst similar to Sample 4 in which the support has been uniformly impregnated with cerium. Sample 5 was prepared by impregnating 3129.6 g $Al_2O_3$ support with an aqueous solution containing 97.0 g $Ce(NO_3)_3.6H_2O$ in 2750 cm$^3$ of de-ionized water. The resultant support was air dried and calcined in air for 4 hours at 500° C. Next, palladium was impregnated on the support, it being noted that rhodium could have been next applied instead. This was accomplished using 5360 cm$^3$ of an impregnating aqueous solution containing 38.1 cm$^3$ of a $PdCl_2$ solution at 0.0313 g Pd/cm$^3$ and 16.34 g citric acid monohydrate. This was impregnated onto 6086.8 g of Ce/$Al_2O_3$. The catalyst was air dried and then calcined for 4 hours at 500° C. in air. Impregnation with rhodium was next accomplished using 5864 cm$^3$ of an aqueous solution containing 32.7 cm$^3$ of $(NH_4)_3RhCl_3$ solution at 0.0032 g Rh/cm$^3$, 0.6809 g $(NH_4)_3RhCl_6.3H_2O$, 22.8 cm$^3$ of 3 M HCl, and 6.6708 g citric acid monohydrate to impregnate 5964 g of Pd/Ce—$Al_2O_3$ catalyst. The catalyst was air dried and then calcined for 4 hours at 500° C. in air. Finally, the outer layer of platinum was applied using 461.6 cm$^3$ of a Pt solution at 82.8 cm$^3$ of $H_2PtCl_6.9H_2O$ solution, 0.039 g Pt/cm$^3$ in 500 cc total volume, this being sprayed on 5922.4 g of Rh/Pd/Ce—$Al_2O_3$ catalyst. The catalyst was air dried and calcined in air for 4 hours at 500° C.

Sample 6 was prepared by the coimpregnation of palladium and rhodium on the support. An aqueous solution of 2700 cm$^3$ containing 27.4 cm$^3$ of $(NH_4)_3RhCl_6.3H_2O$ solution at 0.0025 g Rh/cm$^3$, 19.5 cm$^3$ $PdCl_2$ at 0.0314 g Pd/cm$^3$, 12.0 cm$^3$ 3 M HCl, and 0.48 g of citric acid monohydrate was impregnated on 3129 g of alumina. This catalyst was then air dried and calcined in air for 2½ hours at 500° C. The outer platinum layer was then applied. An aqueous Pt solution of pH=1.23 containing 55.7 cm³ of $H_2PtCl_6.9H_2O$ at 0.040 g Pt/cm³ in a total volume of 300 cm³ was prepared. 241.0 cm³ of this prepared solution was sprayed on 3095.7 g of Pd-Rh/$Al_2O_3$ catalyst. The resulting catalyst was air dried and calcined for 4 hours at 500° C. in air.

In view of the relatively small amounts of rhodium present on the catalyst, we have found the Ion Microprobe Mass Analysis technique well suited for the determination of the relative distribution of rhodium as a function of distance into the support. Scanning across the support pellet was accomplished by using a rectangular probe sized 25μ by 15μ. Since both rhodium and aluminum ions are sputtered off the support, the intensity ratio of rhodium to aluminum was measured to eliminate variances in the amount of aluminum due to the variance in surface structure scanned. Also, since at the start of a scan from the support surface inwardly, as was here used, the probe face was partially off the pellet, the measurement of the distance or depth as shown in FIG. 1 must be shifted to the right by the amount indicated by the first relatively sharp break point in direction of the ion intensity curve, this representing the point where significant quantities of aluminum were sputtered from the surface. This amount varies from about 5 to about 12μ with a probe face of the noted dimensions, depending on the roughness of surface. Applying this to FIG. 1, the surface of Sample 4 is actually at the point representing about 8μ on the distance scale and the maximum rhodium concentration is at about 66μ less 8μ or at about 58μ.

Various platinum, palladium and rhodium salts may be used, it being merely necessary that the salts be soluble in water so as to enable impregnation by any of the application techniques known in the art, e.g., spraying, dunking, tumbling. Similarly, drying and calcining treatment may be varied with temperatures and times generally being inversely related. Temperatures as low as 80° C. may be used for drying and as low as 200° C. for calcination. Calcination temperatures may be as high as desired provided the support is not signficantly sintered and dispersion of the catalyst material is not significantly reduced. Also as indicated in the Sample descriptions above and as set forth in greater detail in our copending application U.S. Ser. No. 815,982, various site blocking agents may be used to control the impregnation of the support with the catalytically active materials.

The amounts of catalytically active material used for Samples 4, 5 and 6 as shown in Table I are approximately those corresponding to the ratios of platinum, palladium and rhodium found in the ore as mined. While it is preferred that these materials should be used in such relative amounts, it should be understood that the amount of material is not basic to our invention and may be varied as required to achieve the desired level of performance. It should be recognized that amount variations may vary the depth of the layers of catalytically active material. The desired amount of site blocking agent required is readily determined by routine sample treatment using the desired method as described in U.S. Ser. No. 815,982 and the analysis of layer depths as disclosed. In preparing the catalysts of our invention, the depth of the first layer, platinum, is preferred to be that to which the poisons will penetrate over the desired lifetime of the catalyst, a depth of from about 30 to 90 microns being indicated in Table I. It should be understood that this depth will vary depending on the concentration of poisons in the emissions gas stream and on the physical properties of the specific report.

The technique for visualizing the platinum on the various samples using a boiling $SnCl_2$ solution is described in detail in our copending application Ser. No. 871,706, the pertinent portions of this application being incorporated herein by reference to the extent applicable or expressly referred to herein. As noted in Table I, palladium is also visualized by the same technique, the color of platinum being black or brown, palladium being dark gray.

Our experiments with platinum, palladium and rhodium catalysts showed that layered catalyst design can produce a low rhodium catalyst having overall comparable performance with, and better CO light-off performance than, a commercial catalyst having about nine times as much rhodium. This is shown in FIGS. 2, 6, 9 and 10 and in Table III below.

Table III

| Sample | Catalyst Conversion - Fresh-cycled/Aged-static | | | |
|---|---|---|---|---|
|  | 1 | 4 | 5 | 6 |
| Rh (wt. %) | 0.019 | 0.0026 | 0.0031 | 0.0021 |
| Pt (wt. %) | 0.045 | 0.048 | 0.055 | 0.053 |
| Pd (wt. %) | — | 0.015 | 0.020 | 0.017 |
| Ce (wt. %) | — | — | 1.0 | — |
|  | a   b | a   b | a   b | a   b |
| HC (%)* | 98   36 | 98   38 | 97   44 | —   45 |
| CO (%)** | 97   32 | 81   38 | 90   48 | —   39 |
| $NO_x$ (%)** | 97   32 | 81   38 | 90   48 | —   39 |

*at stoichiometric A/F = 14.65
**at CO/NO crossover point (A/F point where NO and CO conversion are equal, FIGS. 2–9 and 11–13, found to have good correlation with exhaust analysis by the 1975 Federal Test Procedure).
a % conversion in a 4261 cm³ converter in fresh-cycled engine dynamometer tests using certification fuel.
b % conversion in a 1000 cm³ converter in aged-static accelerated engine dynamometer tests using high P, Pb and S containing fuel.

For the aging process, the A/F ratio was continuously changed from 13.7 to 15 (in 20 sec) and back (in 20 sec), by moving the choke plate with an electric motor. It should be noted that the aged-static tests were done as accelerated engine dynamometer testing for a 20 hour period for each of Samples 1, 4, and 5, and 19 hours for Sample 6, a fuel having extra high phosphorus content being used as shown in Table IV. In accelerated testing, a 1000 cm³ converter was employed which operated at a high space velocity (approximately 130,000 hr⁻¹ at 22° C. and 1 atm). This had the advantage of suppressing the conversions from near 100% at low space velocities of about 20,000 hr⁻¹ on the real-time engine dynamometer using a 4261 cm³ converter to a well measurable range, so that differences between catalysts became more pronounced and easier to observe.

In conducting our tests, the inlet temperature to the converter was between about 560° and 570° C. unless otherwise noted. The exit temperatures varied between about 580° and 630° C., depending upon the degree of conversion over the catalyst which determined the amount of heat generated. The compositions of the fuels employed are shown in Table IV.

Table IV

| Poison Content of the Test Fuels Employed | | | |
|---|---|---|---|
|  |  | Fuel b | 77 cert. |
| Pb | (g/l) | 0.012 | 0.00045 |
| P | (g/l) | 0.014 | 0.00005 |

Table IV-continued

| Poison Content of the Test Fuels Employed | | Fuel b | 77 cert. |
|---|---|---|---|
| S | (g/l) | 0.117 | 0.080 (approx.) |

Fuel b contained higher P and Pb levels than typical certification fuels. Since the time scale of catalyst poisoning experiments is related to the level of poisons in the feedstream to the catalyst, fuel b was found to approximate 80,000 km (48,000 miles) poison exposure in about 20 hours.

The catalyst performance results shown in the drawings and discussed herein were generated by static engine dynamometer tests, cycled engine dynamometer tests, in a closed-loop Vega, and by a laboratory bench test developed for this purpose.

More particularly, static engine dynamometer tests involving accelerated aging and catalyst activity were performed using a 5.7 liter V-8 engine which ran at 1800 rpm at 47 kPa manifold vacuum. The catalyst converter had a volume of 1000 cm$^3$ and the space velocity was about 130,000 hr$^{-1}$. Fuel b in Table IV was employed in these accelerated aging tests, which simulated 80,000 km exposure in about 20 hr. Continuous measurement of $O_2$, HC, CO, NO, and $NH_3$ was performed, before and after the catalyst bed. The activity of the catalyst was determined in situ, at various A/F values.

Cycled engine dynamometer tests involving catalyst activity were performed using a 5.7 liter V-8 engine which was operated at a fixed 1400 rpm. The A/F ratio oscillated ±0.5 units around its midpoint, with a frequency of 1 Hz. The midpoint was slowly moved from lean to rich, covering an A/F band of about ±0.3 around stoichiometry. The system employed a closed-loop control scheme with an oxygen sensor and an electronic controller. The A/F was modulated by fuel injection below a carburetor which was set to a constant lean A/F. Typical output information included CO, NO and HC conversions, time averaged, and oxygen sensor set-point, as a function of A/F (calculated from exhaust gas composition). The inlet gas temperature to the 4261 cc converter was about 480° C. The exhaust gas flow rate was about 33,000 cm$^3$/sec (20° C., 1 atm) with a corresponding space velocity of 27,900 hr$^{-1}$. Certification fuel, Table IV, was used.

Real-time engine dynamometer aging tests involved exposing catalysts to the exhaust of 5.7 liter V-8 engines which ran on certification fuel, Table IV. The closed-loop engine dynamometers were programmed to follow a cycle which was designed to simulate the AMA durability cycle. After 50 hr intervals, the converters were withdrawn for activity testing on the cycled dynamometer described above and subsequently mounted on a different engine, so that each catalyst was exposed to a planned sequence of different engines during the 1000 hr durability test. This 1000 hr test was designed to simulate approximately 80,000 km of automobile service.

FTP tests on a closed-loop Vega model car employed a vacuum-modulated carburetor. Typical engine-out emissions during the 1975 FTP were: 2.2 g/mile HC, 11.0 g/mile CO, 2.3 g/mile NO. These car tests involved a cold start, while the above discussed cycled dynamometer tests did not. Consequently, the FTP tests were influenced by the light-off performance of the catalyst, and this provided a more realistic measure of catalyst performance. The results discussed here were generated on type 260, 4261 cm$^3$ converters. Certification fuel, Table IV, was employed.

From an examination of the performance curves and Table III, it is clear that the low rhodium layered palladium containing catalysts of our invention, Samples 4, 5, and 6, are comparable in NO, CO, HC conversion performance with the high rhodium commercial non-layered catalyst, Sample 1. Also, the catlysts of our invention are shown to be significantly better than the high rhodium catalyst with respect to light-off, especially after sintering. Similarly, the low rhodium, layered, palladium containing catalysts of our invention are comparable in NO and CO conversion, somewhat better in HC performance, and, with respect to light-off, significantly better than the low rhodium layered catalysts without palladium, Samples 2 and 3. We prefer to add about 1 wt. % cerium to the support alumina in order to achieve significantly lower fresh light-off of the catalysts of our invention without substantial increase in the aged or sintered light-off. The light-off performance data referred to is clearly shown in FIG. 10.

Figure 4:
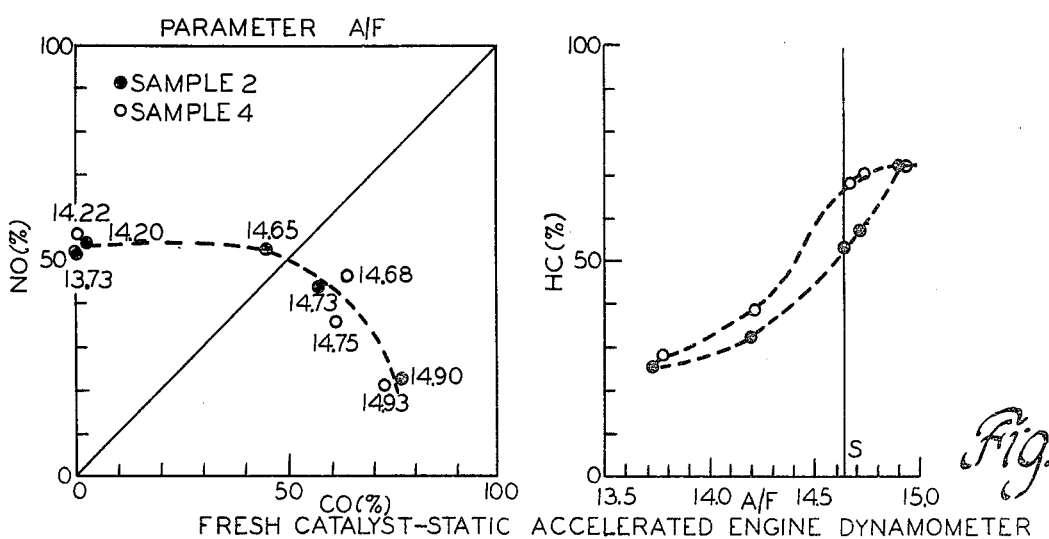
Figure 5:
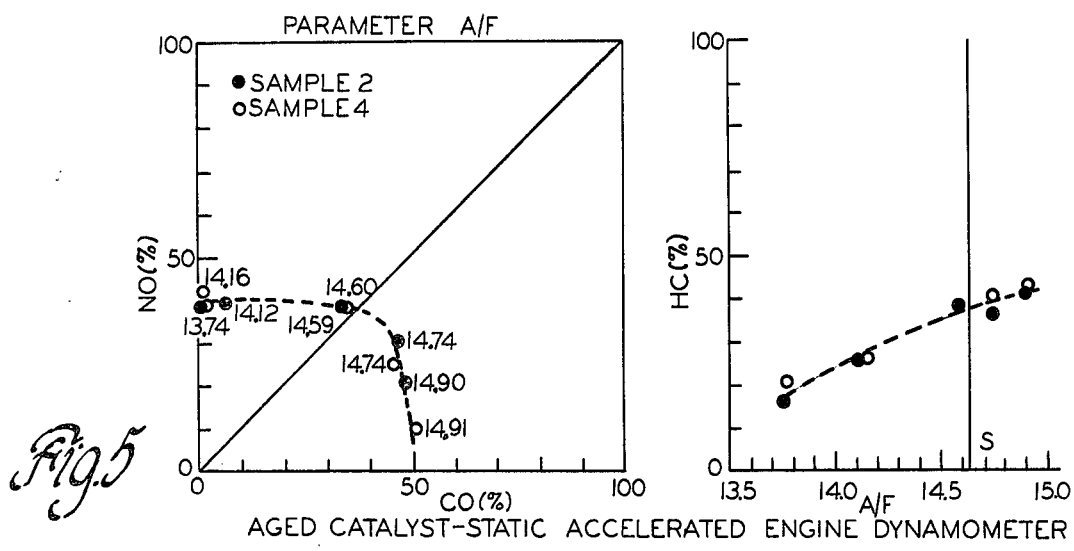
Figure 6:
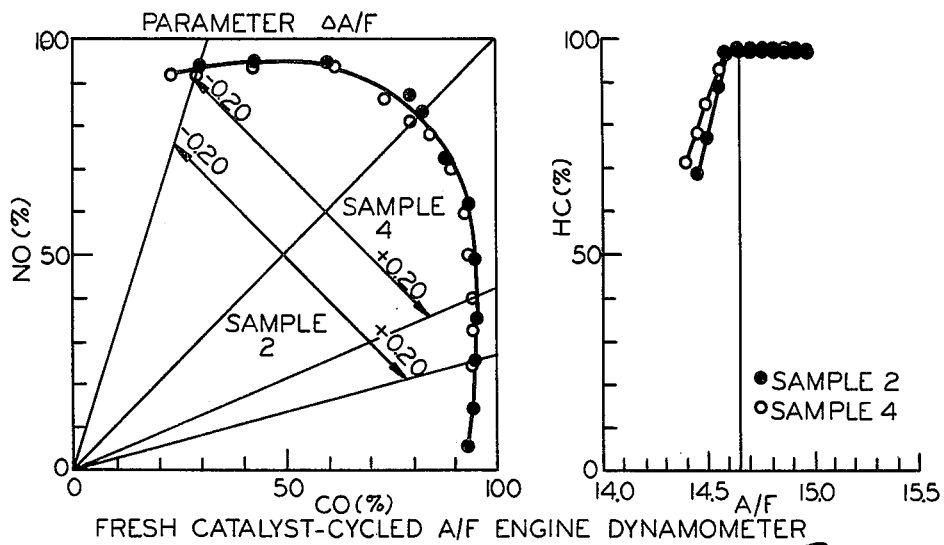
Figure 7:
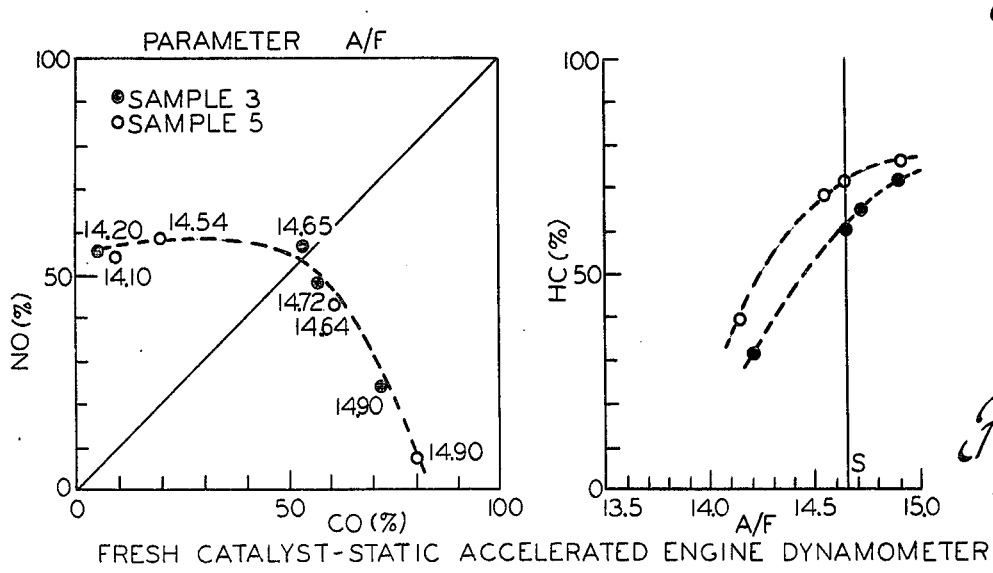

We have found that the addition of 1 wt. % cerium, 2.3 wt. % as $Ce_2O_3$, improves the cycled performance of fresh catalysts of our invention as shown in FIGS. 6 and 9, and improves their performance in static aged or poisoned accelerated dynamometer testing as shown in FIGS. 5 and 8. There is very little effect in the addition of cerium on static performance of our layered fresh catalysts as shown in FIGS. 4 and 7.

Figure 2:
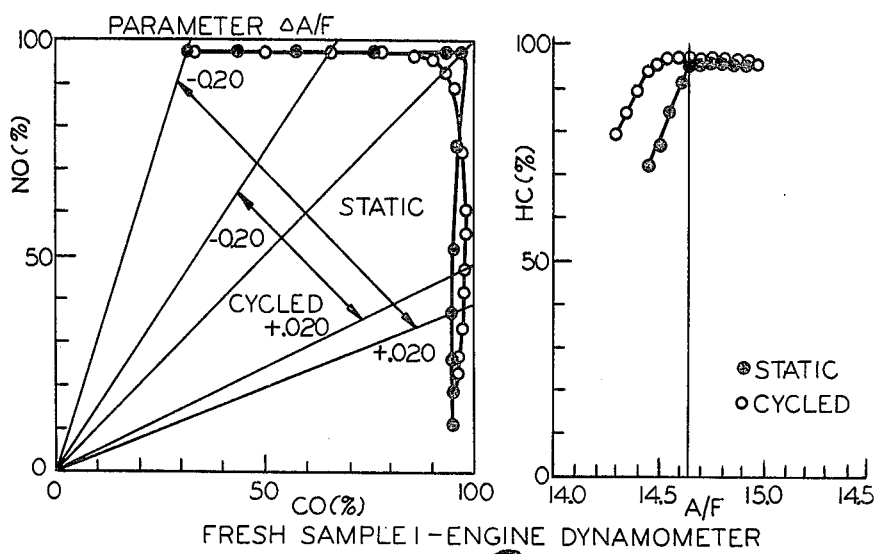
Figure 3:
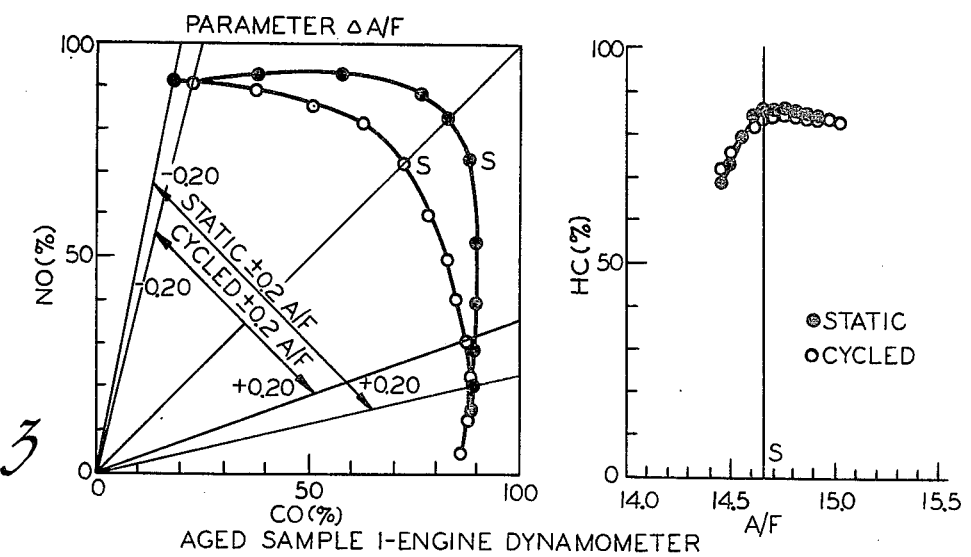

FIGS. 2 and 3, showing the NO, CO and HC performance data for the high rhodium commercial Sample 1 in the fresh and aged or poisoned state, are in the same form as that for the remaining samples. More particularly, the NO and CO conversion data are presented on the same plot for selected ΔA/F values and the crossover point with the diagonal has been shown to have a close relationship to the NO and CO conversion values at the stoichiometric A/F. While the prior art, e.g., U.S. Pat. No. 4,024,706 defines the A/F window as the A/F values at a fixed conversion, i.e., 80%, we have redefined and applied this term to mean the conversions at a fixed A/F bandwidth around stoichiometry, e.g., S±0.2 A/F. This bandwidth can be selected, preferably, to reflect the degree of A/F control in a particular control system.

As shown in FIG. 3, A/F oscillations over the fresh catalyst had only a slight effect on the NO—CO crossover point, while they significantly improve the A/F window. The rich HC conversion also benefited from cycled operation over this fresh catalyst.

The aged catalyst Sample 4, having 503 hrs. on a cycled dynamometer, responded quite differently to A/F oscillations, as shown in FIG. 3. The A/F window improved only slightly but the NO-CO crossover point suffered a significant decrease, the HC conversion remaining essentially unchanged. Since it is important for a catalyst to maintain its conversion performance when aged, it may be concluded that, at least for this particular catalyst, slow A/F oscillations, ±0.5 A/F at 1 Hz, have a detrimental overall effect. This was confirmed for the other Samples by cycled laboratory bench tests. Since low-frequency A/F oscillations in automobile exhaust appear to be common in three-way catalyst operation, a successful catalyst has to be able to accommodate them, this being accomplished by adding cerium to the alumina support, see FIGS. 6 and 9.

As noted above, in addition to their warmed-up performance, three-way catalysts are also judged by their ability to light-off at a low temperature. To test their light-off performance, Samples 1 to 6, and Sample 6 with cerium added, were investigated in a laboratory reactor under oxidizing conditions. The feedstream consisted of 1.5% $O_2$, 0.3% CO, 0.025% propylene, 10% $CO_2$, 10% $H_2O$, and $N_2$ to 100%, and the temperature was gradually increased (10° C./minute). The space velocity was 85,000 $hr^{-1}$ at 20° C. and 1 atm.

FIG. 10 compares the 50% CO conversion temperatures of our seven catalysts before and after thermal exposure at 900° C. for 2 hours in air. The results can be summarized very briefly: Ce enhances the initial light-off performance, while Pd primarily enhances the light-off performance after thermal exposure. Consequently, both Ce and Pd have a beneficial overall effect on the performance of Pt/Rh catalysts.

The fresh performance of Samples 1 to 5 was also evaluated in a type 260, 4261 $cm^3$, converter installed in a closed-loop Vega. The FTP conversion efficiencies are listed in Table V. The simultaneous addition of Pd and Ce to our low-Rh catalyst significantly improved the fresh HC, CO and NO conversions when compared with any other combinations. (These car data include both cold-start and hot conversion performances as dictated by the FTP procedure).

Table V

Vehicle FTP Tests on Fresh Catalysts (closed-loop Vega, vacuum modulated carburetor)

| Catalyst Sample | Overall Test Efficiency (%) | | |
|---|---|---|---|
| | HC | CO | NO |
| 1* (Pt-Rh) | 83 | 76 | 89 |
| 2 (Pt/Rh) | 80 | 64 | 72 |
| 3 (Pt/Rh//Ce) | 80 | 74 | 75 |
| 4 (Pt/Rh/Pd) | 78 | 67 | 73 |
| 5 (Pt/Rh/Pd//Ce) | 84 | 79 | 83 |

*:High-Rh

While the overall NO conversion efficiency of the catalysts of our invention has been discussed, it is well known that three-way catalysts may also form some $NH_3$. The fraction of NO converted to $NH_3$ is largest at rich A/F, and rapidly diminishes as the A/F approaches the stoichiometric point and beyond, so that close to stoichiometry $NH_3$ formation is negligible.

Table VI summarizes the data for the catalysts we investigated. All conversions were measured at a rich A/F, approximately 13.6–13.7 A/F units, in order to exaggerate the $NH_3$ effect for the purpose of easy observation. Essentially no $NH_3$ was formed over any of these catalysts near stoichiometry.

Table VI lists the overall NO conversions, and also the selectivities to $N_2$ and $NH_3$. The fresh catalysts produced more $NH_3$ than the aged catalysts. The coimpregnated (Pt-Rh) high-Rh catalyst, Sample 1, lost both NO and $NH_3$ activity upon aging since both Pt and Rh were partially poisoned. The subsurface Rh catalyst designs lost mainly $NH_3$ activity, since poisoning was primarily limited to Pt. The layered catalysts retained almost all of their $N_2$ activity due to Rh remaining unpoisoned. As noted above, 20 hours of aging is equivalent to about 1000 hours of real-time testing.

Table VI $NH_3$ Formation at Rich A/F Values (High Space Velocity Accelerated Dynamometer Experiments). Fuel b (Table IV) was used in the accelerated poisoning tests.

| Catalyst Sample | Composition | Age(hr.) | A/F | Overall NO Conversion (%) | Fraction of inlet NO converted to $NH_3$ (%) | Fraction of inlet NO converted to $N_2$ (%) | NO to $N_2$ / NO to $NH_3$ |
|---|---|---|---|---|---|---|---|
| 1 | Pt-Rh | 0 | 13.65 | 85.9 | 45.9 | 40.0 | 0.87 |
| | | 20 | 13.59 | 38.2 | 10.6 | 27.6 | 2.6 |
| 2 | Pt/Rh | 0 | 13.73 | 50.4 | 13.4 | 37.0 | 2.8 |
| | | 20 | 13.74 | 38.3 | 3.0 | 35.3 | 11.8 |
| 3 | Pt/Rh//Ce | 0 | 13.75 | 50.7 | 8.8 | 41.9 | 4.8 |
| | | 20 | 13.71 | 41.0 | 5.0 | 36.0 | 7.2 |
| 4 | Pt/Rh/Pd | 0 | 13.78 | 51.1 | 15.2 | 35.9 | 3.0 |
| | | 20 | 13.72 | 37.5 | 5.1 | 32.4 | 6.4 |
| 5 | Pt/Rh/Pd//Ce | 0 | 13.59 | 53.1 | 19.2 | 33.9 | 1.8 |
| | | 20 | 13.72 | 42.7 | 10.3 | 32.4 | 3.1 |

The durability of the Pt/Rh/Pd//Ce, Sample 5, catalyst design in a real-time, closed-loop, cycled dynamometer aging test is of interest as a practical application of the catalyst of our invention.

The transient data were plotted in the NO—CO conversion domain in FIG. 11, at 0 and 500 hrs. of exposure on the cycled dynamometer. The effects of aging are clear in that while the rich NO and lean CO limits changed relatively little, the CO—NO crossover deteriorated significantly. Since the deactivation affected the conversions primarily near stoichiometry where the least degree of diffusion influence prevails, it is suspected that the deactivation is primarily associated with the uniform loss of active sites as opposed to poremouth poisoning which would mainly affect the rich NO and lean CO limits.

FIG. 12 shows the deactivation of the high-Rh commercial catalyst, Sample 1, in the same cycled dynamometer test as for Sample 5. Again, only a small deterioration in the A/F window is observed. However, when compared with FIG. 11, we note that this high-Rh catalyst suffered a somewhat smaller conversion loss than the low-Rh catalyst near the crossover point, obviously due to its much larger noble metal content.

FIG. 13 shows the NO, CO and HC conversion performance for static dynamometer testing of both fresh and aged Pt/Rh-Pd catalyst, Sample 6, the rhodium and palladium being codeposited as a second layer beneath the platinum outer layer. Comparison with the data in FIGS. 4 and 7 for fresh catalyst and 5 and 8 for aged catalyst shows substantially similar performance with the codeposited Sample having somewhat better HC performance for the aged and fresh catalysts.

It is clear from the above-description and drawings that we have developed a low rhodium three-way catalyst of the layered type having platinum as the outer layer with palladium and rhodium interior thereof having overall comparable performance with and better light-off performance than commercial catalysts having about nine times as much rhodium. Obvious modifications such as the partial overlapping of the second rhodium layer with palladium will occur to those skilled in the art and are within the intended scope of our invention as covered by the claims which follow.

The embodiments of the invention in which as exclusive property or privilege is claimed are defined as follows:

1. A three-way catalyst adapted for use in a system operating at about the stoichiometric air/fuel ratio of an automotive engine and having desirable conversion and poison resistance characteristics, consisting essentially of an alumina support having platinum, palladium and rhodium deposited thereon and having a first layer of the catalyst material platinum which is resistant to poisoning by lead and phosphorous, the concentration of platinum being maximum at the surface of said support and decreasing with progressive penetration into said support, a second layer of catalyst material selected from the group consisting of rhodium and a mixture of palladium and rhodium adjacent to and inward of said first layer and penetrating the body of the support, the concentration of the catalyst material of the second layer present in the first layer being at a minimum at or close to the surface and increasing to a maximum with increasing depth of penetration, the greater portion of the catalyst materials other than platinum being below said first layer, and palladium being inward of and adjacent to said second layer where the catalyst material of said second layer is rhodium, said first layer of platinum serving to protect the rhodium and palladium therebelow from poisoning, the total amount of rhodium on said catalyst being as low as about 0.002% or more by weight.

2. A three-way catalyst adapted for use in a system operating at about the stoichiometric air/fuel ratio of an automotive engine and having desirable conversion and poison resistance characteristics, consisting essentially of an alumina support having platinum, palladium and rhodium deposited thereon and having a first layer of the catalyst material platinum which is resistant to poisoning by lead and phosphorous, the concentration of platinum being maximum at the surface of said support and decreasing with progressive penetration into said support, a second layer of catalyst material selected from the group consisting of rhodium and a mixture of palladium and rhodium adjacent to and inward of said first layer and penetrating the body of the support, the concentration of the catalyst material of the second layer present in the first layer being at a minimum at or close to the surface and increasing to a maximum with increasing depth of penetration, the boundary between said layers where rhodium is the second layer catalyst material being the depth of maximum concentration of rhodium, and the boundary between said layers where a mixture of palladium and rhodium is the second layer catalyst material being the first to occur of either the depth of maximum concentration of rhodium or the depth of equal concentration of platinum and palladium, the concentration of the catalyst material of the second layer decreasing progressively with increasing penetration from its depth of maximum concentration, the greater portion of the catalyst materials other than platinum being below said first layer, and palladium being inward of and adjacent to said second layer where the catalyst material of said second layer is rhodium, said first layer of platinum serving to protect the rhodium and palladium therebelow from poisoning, the total amount of rhodium on said catalyst being as low as about 0.002% or more by weight.

3. A catalyst as set forth in claim 1 wherein the depth of said first layer containing platinum is at least that to which the poisons in the exhaust gases will penetrate over the desired lifetime of said catalyst.

4. A catalyst as set forth in claim 1 wherein said first layer of platinum has a depth of at least about 58 microns.

5. A catalyst as set forth in claim 1 wherein cerium oxide is deposited on said support.

6. A catalyst as set forth in claim 1 wherein cerium oxide is deposited on said support in an amount of at least about 2.3% by weight as $Ce_2O_3$.

* * * * *

UNITED STATES PATENT AND TRADEMARK OFFICE
CERTIFICATE OF CORRECTION

PATENT NO. : 4,153,579
DATED : May 8, 1979
INVENTOR(S) : Jack C. Summers and Louis Hegedus It is certified that error appears in the above-identified patent and that said Letters Patent are hereby corrected as shown below:

Col. 3, line 10, "or" (first occurrence) should read -- of --.

Col. 7, line 41, "iron" should read -- ion --.

Col. 10, line 4, "report" should read -- support --.

Col. 12, line 8, "catlysts" should read -- catalysts --.

Signed and Sealed this

Eleventh Day of September 1979

[SEAL]

Attest:

Attesting Officer

LUTRELLE F. PARKER
Acting Commissioner of Patents and Trademarks